United States Patent
Guerin

(10) Patent No.: US 12,043,323 B2
(45) Date of Patent: Jul. 23, 2024

(54) METHOD FOR FASTENING A COVER ON AN ORIFICE OF A POWER STEERING SYSTEM AND SUCH A COVER

(71) Applicant: JTEKT EUROPE, Irigny (FR)

(72) Inventor: Mickael Guerin, Brindas (FR)

(73) Assignee: JTEKT EUROPE, Irigny (FR)

( * ) Notice: Subject to any disclaimer, the term of this patent is extended or adjusted under 35 U.S.C. 154(b) by 54 days.

(21) Appl. No.: 17/703,422

(22) Filed: Mar. 24, 2022

(65) Prior Publication Data

US 2022/0332361 A1   Oct. 20, 2022

(30) Foreign Application Priority Data

Apr. 15, 2021   (FR) ..................................... 21/03919

(51) Int. Cl.
| | |
|---|---|
| *B62D 5/04* | (2006.01) |
| *F16H 57/02* | (2012.01) |
| *F16H 57/03* | (2012.01) |
| *F16H 57/031* | (2012.01) |

(52) U.S. Cl.
CPC ............ *B62D 5/0403* (2013.01); *F16H 57/03* (2013.01); *F16H 57/031* (2013.01)

(58) Field of Classification Search
CPC ...... B62D 5/04; B62D 5/0403; B62D 5/0406; F16H 57/029; F16H 57/031; F16H 2057/02082; F16H 57/03
See application file for complete search history.

(56) References Cited

U.S. PATENT DOCUMENTS

| | | | | |
|---|---|---|---|---|
| 7,004,636 | B2* | 2/2006 | Deschler | F16H 57/021 384/456 |
| 7,231,847 | B2* | 6/2007 | Hibbler | F16H 57/037 74/606 R |
| 7,404,333 | B2* | 7/2008 | Kesseler | G01D 11/245 73/514.39 |
| 8,322,182 | B2* | 12/2012 | Haas | B21D 22/16 72/348 |
| 8,919,170 | B2* | 12/2014 | Haas | B21D 53/28 72/348 |
| 9,915,340 | B2* | 3/2018 | Fuechsel | F16H 57/032 |
| 9,962,875 | B2* | 5/2018 | Fuechsel | F16J 15/14 |

(Continued)

FOREIGN PATENT DOCUMENTS

| | | | | |
|---|---|---|---|---|
| DE | 102006024767 A1 * | 11/2007 | | B29C 65/645 |
| DE | 102008000517 A1 * | 9/2009 | | B29C 65/645 |

(Continued)

OTHER PUBLICATIONS

Machine translation of DE 102012101382 A1 obtained on Jul. 12, 2023.*

(Continued)

*Primary Examiner* — Adam D Rogers
(74) *Attorney, Agent, or Firm* — Oliff PLC

(57) ABSTRACT

A casing of a power steering system, including at least one fastening seat of a cover, the fastening seat delimiting an orifice, the cover being intended to seal the orifice, the fastening seat including a support wall for the cover, wherein the fastening seat also includes at least one elongation portion disposed outside the support wall, the elongation portion having at least one deformation area configured to be folded over the cover.

11 Claims, 3 Drawing Sheets

(56) References Cited

U.S. PATENT DOCUMENTS

| | | | | |
|---|---|---|---|---|
| 10,054,214 B2* | 8/2018 | Monnet | ............... | B62D 5/0421 |
| 10,677,342 B2* | 6/2020 | Ramirez Ortiz | ...... | F16B 5/0664 |
| 11,124,221 B2* | 9/2021 | Rey | ......................... | B29C 45/00 |
| 11,623,681 B2* | 4/2023 | Guerin | .................. | F16H 57/031 |
| | | | | 220/780 |
| 11,635,135 B2* | 4/2023 | Guerin | .................... | F16H 55/24 |
| | | | | 74/425 |
| 2021/0053608 A1* | 2/2021 | Guerin | ..................... | B62D 3/12 |
| 2023/0399044 A1* | 12/2023 | Durillon | ............. | B62D 5/0403 |

FOREIGN PATENT DOCUMENTS

| | | | | |
|---|---|---|---|---|
| DE | 102012101382 A1 * | 8/2013 | ............. | H02K 15/14 |
| DE | 10 2012 110 363 A1 | 4/2014 | | |
| EP | 2213405 A1 * | 8/2010 | ............. | B23P 11/00 |
| EP | 2740874 A1 * | 6/2014 | ............. | E05F 3/227 |
| EP | 3145064 B1 * | 1/2020 | ......... | H02K 11/0094 |
| KR | 20150043833 A * | 4/2015 | | |
| WO | 2009/018986 A2 | 2/2009 | | |
| WO | 2012/004115 A2 | 1/2012 | | |
| WO | WO-2012000526 A1 * | 1/2012 | ............. | B23P 11/00 |

OTHER PUBLICATIONS

Machine translation of EP 2213405 A1 obtained on Feb. 21, 2024.*
Dec. 7, 2021 Search Report issued in French Patent Application No. 2103919.

* cited by examiner

METHOD FOR FASTENING A COVER ON AN ORIFICE OF A POWER STEERING SYSTEM AND SUCH A COVER

The invention relates to the field of casings of power steering systems of motor vehicles, and more specifically, a casing, an assembly as well as a method for fastening a cover on the casing.

BACKGROUND

Motor vehicles include a steering system provided with a steering wheel driving a steering column. Said steering column is connected to a steering case comprising a rack extending along an axis transverse to an elongation axis of the vehicle. The rack allows pivoting the steered wheels of the vehicle.

A power steering system also includes an assist device imparting on the rack an assist force dependent on that given by the driver on the steering wheel. In this way, the force required from the driver to pivot the steering wheel is decreased.

A known type of electric assist device includes an electric motor connected to a casing 1, as represented in FIG. 2, comprising a worm screw, which drives a toothed wheel fastened on a shaft linked to a pinion of the rack.

Such a casing 1 generally comprises one or several fastening seat(s) 2, 3 which delimit an access orifice comprising an inner surface 21. The access orifice crossing an external wall 5 of said casing to enable the introduction and assembly of all or part of the elements of the casing 1.

These fastening seats 2, 3 must be sealed by means of a cover 6 often provided with an O-ring for example, so as to prevent an intrusion of liquid or foreign bodies, such as gravel, dust, into the casing. 1, and thus permanently guarantee the proper operation of the elements protected by the casing 1.

Next, we will focus more particularly on the cover 6 located on the fastening seat 2 of the reduction wheel of the casing 1. However, the invention could be applied to any other cover of the power steering system.

There is a known solution in which the cover 6 is fastened on the casing 1 by means of clips 61, present on the cover 6. Said clips being inserted into a machined groove 51 of the casing 1. More specifically, the groove 51 is machined on the circumference of the inner surface 21 of the orifice 2.

The use of such a cover 6 has the drawback of not being able to visually check the proper insertion of the clips 61 in the groove 51. Thus, it is impossible to check that the cover 6 is properly inserted and held in place. In the same way, it is impossible to check that there has been no damage during the assembly or over time, such as the breakage of a clip 61.

Furthermore, such a cover 6 requires cooperating with a groove 51 which must be made in the casing 1 after the latter has been manufactured. This is therefore an additional operation on the casing 1 which leads to an increase in the manufacturing cost.

SUMMARY

The object of the invention is to remedy all or part of the aforementioned drawbacks by proposing a casing of a power steering system, comprising at least one seat for fastening a cover, said fastening seat delimiting an orifice, the cover being intended to seal the orifice, the fastening seat comprising a support wall for the cover, characterized in that the fastening seat also comprises at least one elongation portion disposed outside the support wall, the elongation portion being provided with at least one deformation area configured to be folded over the cover.

Thus, the elements intended to hold the cover on the fastening seat, that is to say the elongation portion, are outside the orifice, that is to say that an inner surface of the orifice could be perfectly smooth. The casing according to the invention does not require any machining operation between the manufacture and the installation of the cover. Only an operation of folding the deformation area is carried out after the installation of the cover so as to permanently fasten the cover on the casing. This saves time and money compared to the casing of the state of the art.

The cover is held by means of the deformation area of the elongation portion.

The fastening solution according to the invention is particularly simple, robust and compact.

The invention may have one or more of the following features considered alone or in combination.

According to one embodiment, the fastening seat comprises an inner surface delimiting the orifice, the support wall extending in a direction substantially transverse to the inner surface.

According to one embodiment, the elongation portion extends along a direction substantially parallel to the inner surface.

According to one embodiment, the elongation portion continuously surrounds the support wall.

In this way, the fastening seat is not oriented.

The at least one deformation area may be formed at any place of the elongation portion. There is therefore no orientation of the casing, and therefore of the elongation wall, with respect to a tool allowing deforming the deformation areas.

According to one embodiment, the elongation portion comprises a plurality of deformation areas evenly distributed over the elongation portion.

Thus, the cover is held evenly at several points. Preferably, the elongation portion comprises at least two deformation areas.

Alternatively, the deformation areas are continuous on the elongation portion.

According to one embodiment, the casing is made of aluminum.

Thus, the casing is light and resistant.

The invention also relates to an assembly comprising a casing according to the invention, and a cover held on the orifice by means of at least one deformation area folded over said cover.

The cover comprises a holding edge coming into contact with the support wall. When the holding edge continuously surrounds the cover, the latter could be positioned without taking into account its orientation with respect to the fastening seat. The positioning of the cover is therefore facilitated.

The invention also relates to a method for fastening a cover on a fastening seat of a casing according to the invention, said cover comprising a protective wall surrounded at least partially by a holding edge, the method comprising a step of inserting the cover into the orifice so that the holding edge of the cover is in contact with the at least one support wall, the method comprising a deformation step in which the at least one deformation area is folded over the holding edge.

The method according to the invention comprises a step of inserting the cover during which the cover is brought to seal the orifice of the fastening seat. There is no need to orient the cover with respect to the orifice. This step is therefore particularly simple. The cover must be inserted into the orifice so that the holding edge is in contact with the at least one support wall.

The method then comprises a deformation step allowing fastening the cover permanently on the orifice. The elongation portion comprises the at least one deformation area which is intended to be deformed. Before deformation, the deformation area is not differentiated from the elongation portion which has a component in a direction parallel to the orifice strictly larger than a thickness of the holding edge of the cover.

Thus, when the cover is inserted into the orifice, the elongation portion, and therefore the deformation areas, protrude, or project from the cover.

It is then possible to exert a pressure on the deformation areas of the elongation portion so as to fold the deformation area over the holding edge. There is plastic deformation of the elongation portion, that is to say of the casing.

Finally, the cover is held on the fastening seat by means of the deformation areas which block the cover in the orifice. There is no addition of material or part to fasten the cover. Only the material already present at the level of the fastening seat, and more particularly at the level of the elongation portion is deformed so as to fasten the cover. The method is therefore economical.

Such a fastening method allows visually checking that the cover is properly inserted and held in place since the deformation areas are positioned outside the orifice. Furthermore, it does not require any specific groove in the casing.

According to one embodiment, the deformation step is carried out by means of a mechanical material folding method.

Such a method may be a method for crimping, headforming, scratching or any other known method of upsetting material. A mechanical method does not implement any external heating of the material, thus the method is very safe since there is no risk of burning. Furthermore, it is quick to complete. Finally, there is no thermal deformation of the material which thus retains its internal structure.

Alternatively, the deformation step is carried out by means of a thermal material folding method.

According to one embodiment, during the deformation step, the deformation area is folded by exerting a pressure along a direction substantially parallel to the support wall.

It is possible to exert a pressure on the deformation areas of the elongation portion along a direction substantially parallel to the support wall so as to crush the deformation area on the holding edge.

According to one embodiment, during the deformation step, the deformation area is folded by exerting a pressure along a direction substantially transverse to the support wall.

Thus, the deformation areas of the elongation portion are bent on the holding edge.

According to one embodiment, after deformation, the deformation area has a shape selected from: a triangle, a circle, a square.

The shape of the deformation area after deformation depends on the shape of the tool used to carry out the deformation step.

BRIEF DESCRIPTION OF THE DRAWINGS

The invention will be better understood, thanks to the description below, which relates to an embodiment according to the present invention, given as a non-limiting example and explained with reference to the appended schematic drawings, in which.

DETAILED DESCRIPTION OF EMBODIMENTS

Figure 1:
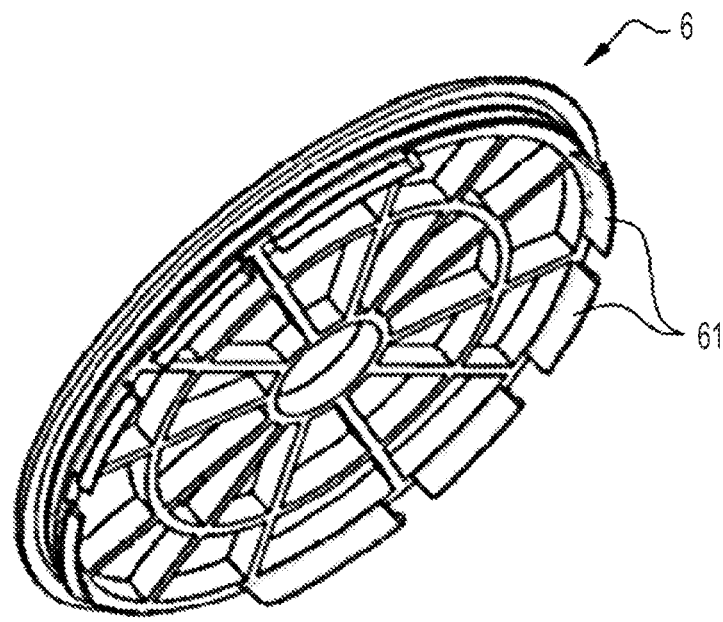
FIG. 1 is a perspective representation of a cover according to the state of the art.
Figure 2:
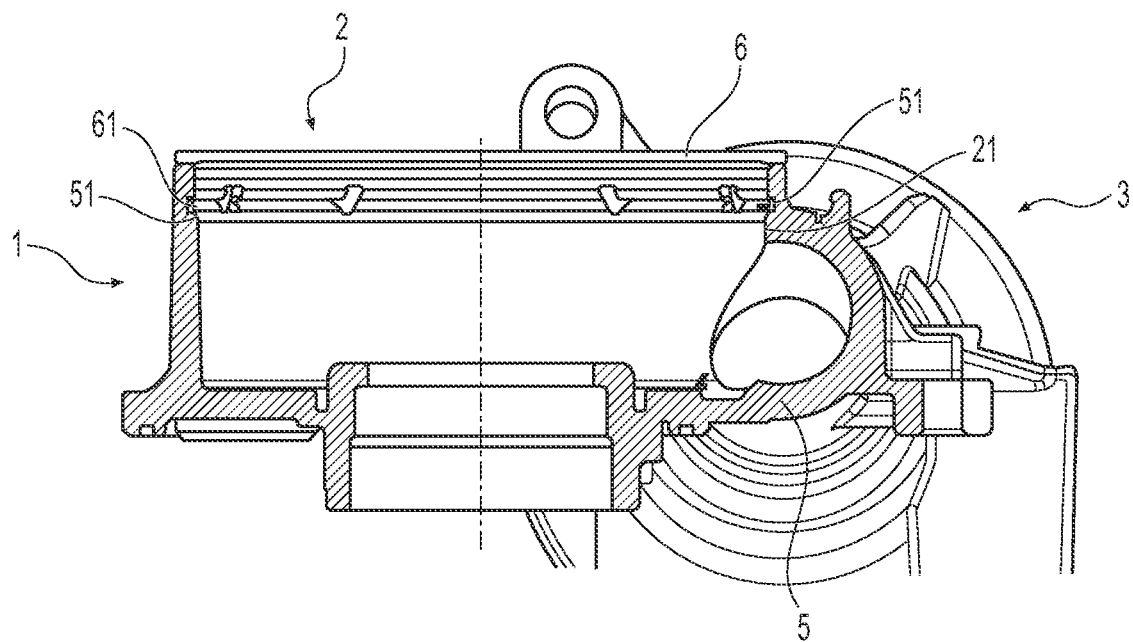
FIG. 2 is a representation of a casing of a power steering system comprising the cover of FIG. 1.

The casing 1' comprises an external wall 5' which could be metallic or made of a rigid plastic material. It accommodates a gear mechanism not represented in the figures.

The mechanism is preferably a reduction gear comprising a reduction wheel and a worm screw which ensures a mechanical transmission between a steering assist motor and a moving member, such as a rack or a steering column. The steering column allows modifying the yaw direction (steering angle) of the steered wheels of the vehicle.

The casing 1' comprises several fastening seats 2, 3, 4 comprising an inner surface 21' delimiting an orifice which crosses the external wall 5' of said casing 1' to enable the introduction and assembly of all or part of the elements of the casing 1'. The fastening seats 2, 3, 4 have a substantially circular shape.

Next, we will focus more particularly on the cover 60 allowing sealing the orifice of the fastening seat 2 positioned on the reduction wheel.

The casing 1' comprises the fastening seat 2 of the cover 60, the fastening seat 2 comprises the inner surface 21' delimiting the orifice, a support wall 53 extending in a direction substantially transverse to the inner surface 21' and an elongation portion 54 extending substantially along the direction of the inner surface 21'. The support wall 53 and the elongation portion 54 are formed in a thickness of the external wall 5'. The inner surface 21' has no recess or depression. It is cylindrical.

The cover 60 comprises a substantially circular protective wall 603 having a diameter substantially equal to the diameter of the orifice 2. The protective wall 603 is prolonged in a plane in which the protective wall 603 extends by a holding edge 602. The holding edge 602 continuously surrounds the protective wall 603.

The protective wall 603 is surrounded by an insertion edge 601 which extends in a direction substantially transverse to the protective wall 603. The insertion edge 601 comprises a location 604 intended to receive an O-ring 70.

Figure 5:
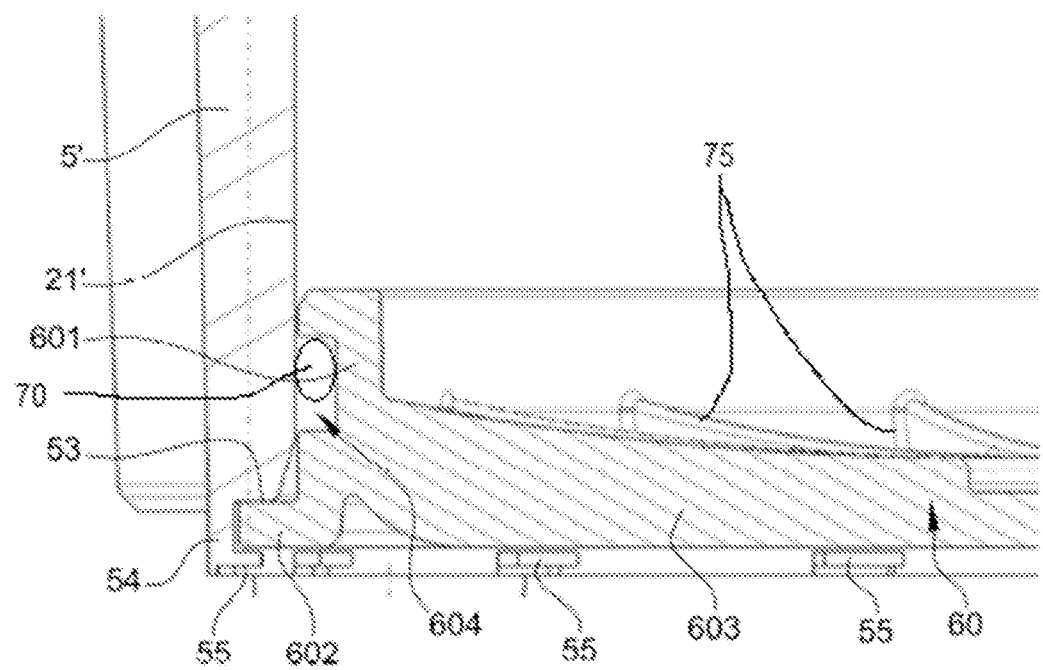
FIG. 5 is a sectional representation of an enlargement of the casing according to FIG. 4.

The cover in embodiments may also include reinforcement elements such as ribs on a surface of the cover. FIG. 5 shows such ribs 75 extending radially from a center of the cover to an outer circumference of the cover.

Figure 3:
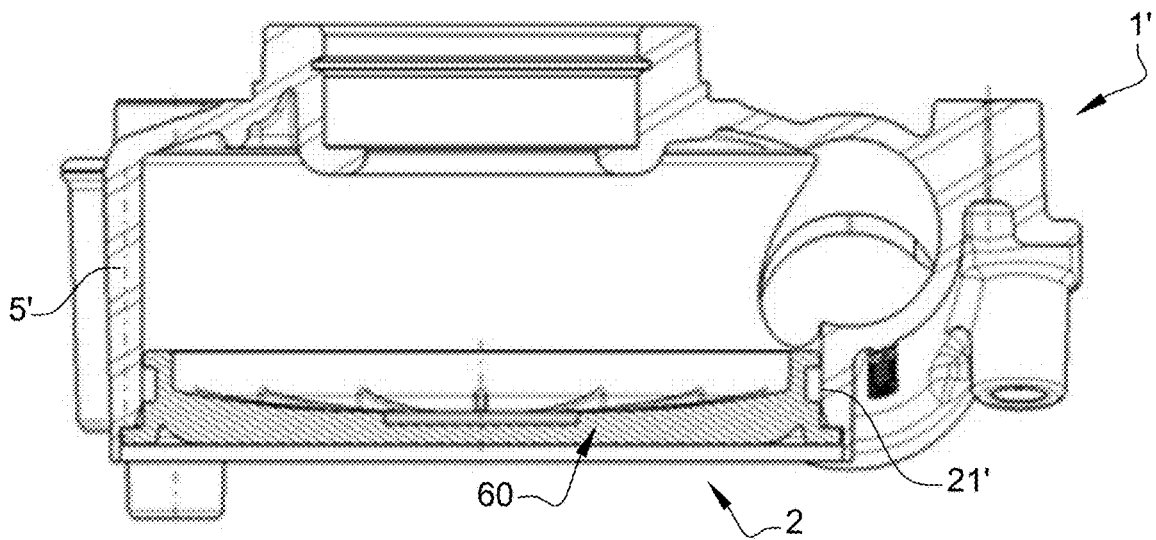
FIG. 3 is a sectional view of the casing of the steering system after carrying out a step of inserting the cover according to the invention.

A method according to the invention for fastening the cover 60 on the orifice 2 comprises a step of inserting the cover 60 into the orifice of the fastening seat 2 as represented in FIG. 3. In this step, the cover 60 is introduced into the orifice so that the insertion edge 601 is in contact with the inner surface 21' and that the holding edge 602 of the cover 60 is in contact with the support wall 53. Thus, the protective wall 603 completely covers the orifice.

A length of the cover 60 along a direction parallel to the protective wall 603 is strictly larger than a dimension of the orifice measured between two opposite inner surfaces 21', and strictly smaller than a dimension of the orifice measured between two increased opposite inner surfaces 21' of the elongation wall 54. In other words, the length of the cover 60 along a direction parallel to the protective wall 603 is strictly larger than a dimension of the orifice measured between two opposite inner surfaces 21', is smaller than or equal to a dimension of the orifice measured between two support walls 53.

The method then comprises a deformation step. During this step, deformation areas 55 of the elongation portion 54 are crushed by means of an anvil along the direction of the inner surface 21' towards the holding edge 602. The deformation areas 55 are evenly distributed over the circumference of the cover. Alternatively, the deformation areas could be continuous on the circumference of the cover 60. The deformation areas 55 have a square shape.

Figure 4:
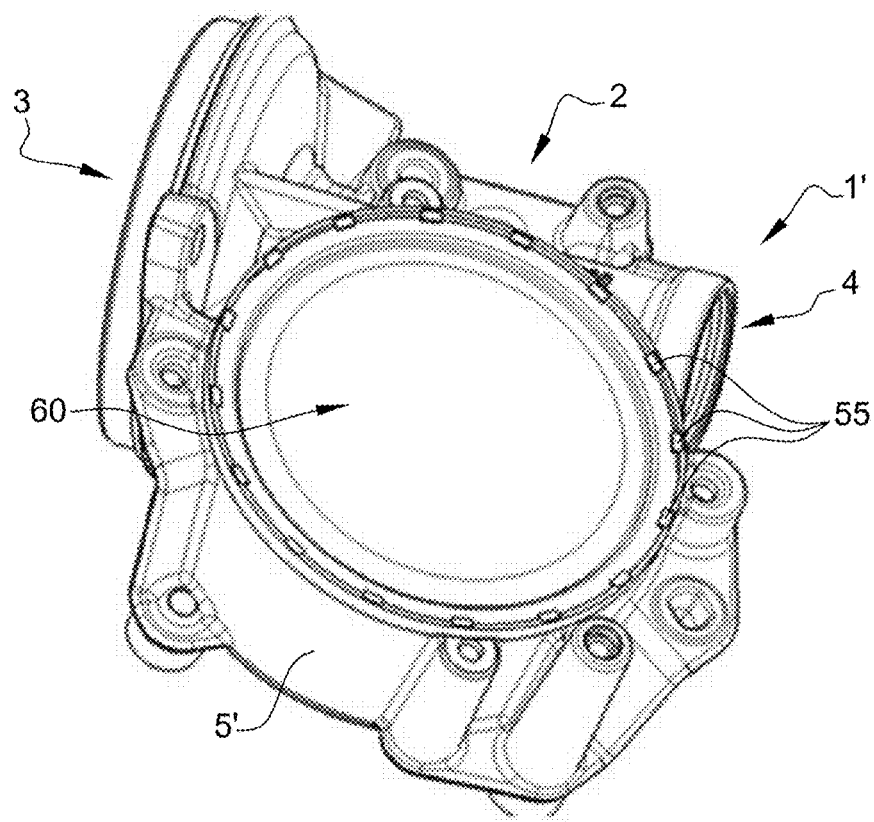
FIG. 4 is a perspective view of the casing of the steering system after carrying out a step of deforming the cover according to the invention.

FIGS. 4 and 5 illustrate the casing 1' after completion of the fastening method according to the invention.

Of course, the invention is not limited to the embodiment described and represented in the appended figures. Modifications are still possible, in particular with regards to the constitution of the various elements or by substitution with technical equivalents, yet without departing from the scope of protection of the invention.

The invention claimed is:

1. An assembly comprising:
   a cover, and
   a casing comprising at least one seat for fastening the cover, the at least one seat is a fastening seat delimiting an orifice, the cover being configured to seal the orifice, the fastening seat comprising a support wall for the cover, wherein the fastening seat also comprises at least one elongation portion disposed outside the support wall, the at least one elongation portion being provided with at least one deformation area configured to be folded over the cover,
   wherein the cover comprises a groove around an outer periphery of the cover configured to accept an O-ring between the outer periphery of the cover and an inner surface of the fastening seat, and
   wherein the casing is a casing of a power steering system of a motor vehicle.

2. The assembly according to claim 1, wherein the inner surface of the fastening seat delimiting the orifice, the support wall extending in a direction substantially transverse to the inner surface.

3. The assembly according to claim 2, wherein the at least one elongation portion extends along a direction substantially parallel to the inner surface.

4. The assembly according to claim 1, wherein the at least one elongation portion is a single elongation portion that continuously surrounds the support wall.

5. The assembly according to claim 1, wherein the at least one deformation area is comprised of a plurality of deformation areas evenly distributed over the at least one elongation portion.

6. The assembly according to claim 1, further comprising the O-ring.

7. The assembly according to claim 1, wherein the cover further comprises ribs on a surface of the cover extending radially from a center of the cover to an outer circumference of the cover.

8. A method for fastening the cover on the fastening seat of the casing according to claim 1, comprising inserting the cover into the orifice so that a holding edge of the cover is in contact with the support wall, and deforming the at least one deformation area over the holding edge.

9. The method according to claim 8, wherein the deforming is carried out by means of a mechanical material folding method.

10. The method according to claim 8, wherein, during the deforming, the at least one deformation area is folded by exerting a pressure along a direction substantially parallel to the support wall.

11. The method according to claim 8, wherein, during the deforming, the at least one deformation area is folded by exerting a pressure along a direction substantially transverse to the support wall.

* * * * *